US009856941B2

(12) United States Patent
Arseneaux et al.

(10) Patent No.: US 9,856,941 B2
(45) Date of Patent: Jan. 2, 2018

(54) SELF-PUMPING FLYWHEEL COOLING SYSTEM

(71) Applicant: Beacon Power, LLC, Tyngsboro, MA (US)

(72) Inventors: James Arseneaux, Westford, MA (US); David Ansbigian, Stoneham, MA (US); Daniel DeSantis, Billerica, MA (US); Norman Brackett, North Reading, MA (US)

(73) Assignee: Beacon Power, LLC, Tyngsboro, MA (US)

( * ) Notice: Subject to any disclaimer, the term of this patent is extended or adjusted under 35 U.S.C. 154(b) by 147 days.

(21) Appl. No.: 14/794,535

(22) Filed: Jul. 8, 2015

(65) Prior Publication Data

US 2017/0009845 A1    Jan. 12, 2017

(51) Int. Cl.
*F16F 15/30* (2006.01)

(52) U.S. Cl.
CPC .................. *F16F 15/302* (2013.01)

(58) Field of Classification Search
CPC ......... F16F 15/302; H02K 9/19; H02K 7/025; H02K 5/20; H02K 1/32; Y02E 60/16
See application file for complete search history.

(56) References Cited

U.S. PATENT DOCUMENTS

| 2,894,155 | A | * | 7/1959 | Labastie | H02K 9/19 188/264 D |
| 3,921,772 | A | * | 11/1975 | Hayashi | F16D 43/24 192/113.21 |
| 2006/0017334 | A1 | * | 1/2006 | Gotmalm | H02K 7/02 310/54 |
| 2010/0264759 | A1 | * | 10/2010 | Shafer | H02K 1/20 310/54 |
| 2014/0124172 | A1 | | 5/2014 | Veltri et al. | |

* cited by examiner

*Primary Examiner* — Thomas C Diaz
(74) *Attorney, Agent, or Firm* — Osha Liang LLP

(57) ABSTRACT

A flywheel system including a rotor shaft. The rotor shaft includes an inner passage therethrough, and a dam with a central opening disposed on a first end of the inner passage. An outer passage surrounds the inner passage. The inner passage is open at a second end, and the outer passage is closed on an end surrounding the second end of the inner passage. The outer passage is open on an end surrounding the first end of the inner passage. Fluid flows into the inner passage at the first end, via the central opening of the dam. Rotation of the flywheel rotor causes the fluid to accumulate along a wall of the inner passage, and to propagate to the second end, where the fluid exits into the outer passage. The fluid propagates along the outer passage to the open end of the outer passage, where it is released.

11 Claims, 11 Drawing Sheets

FIG. 3C
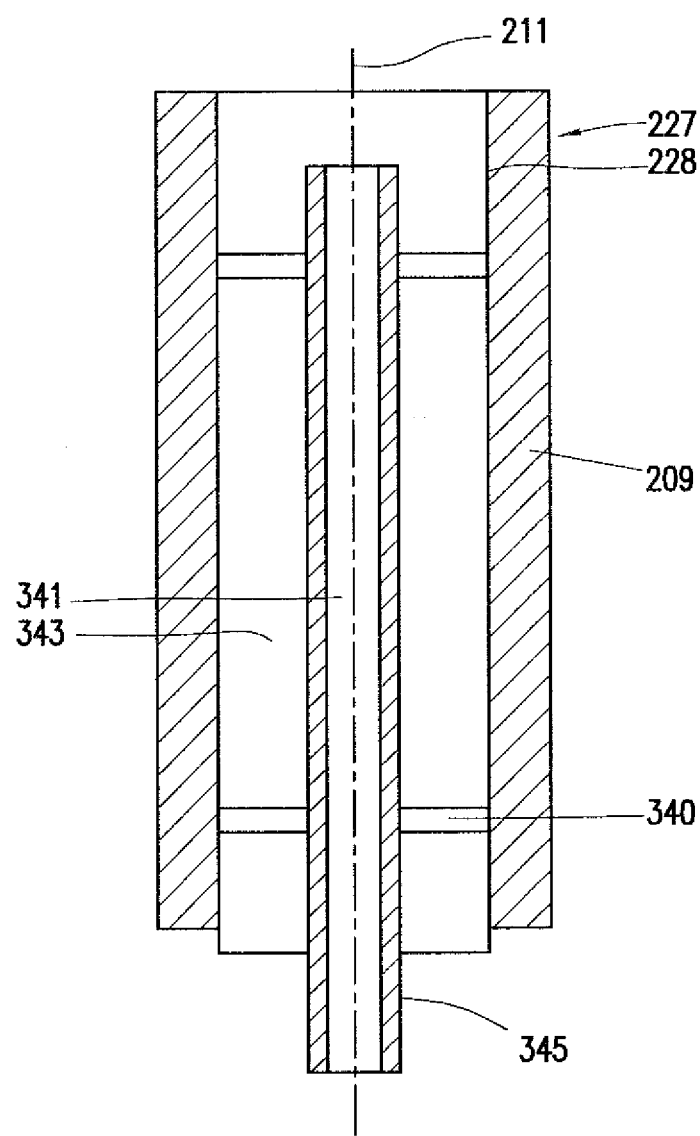
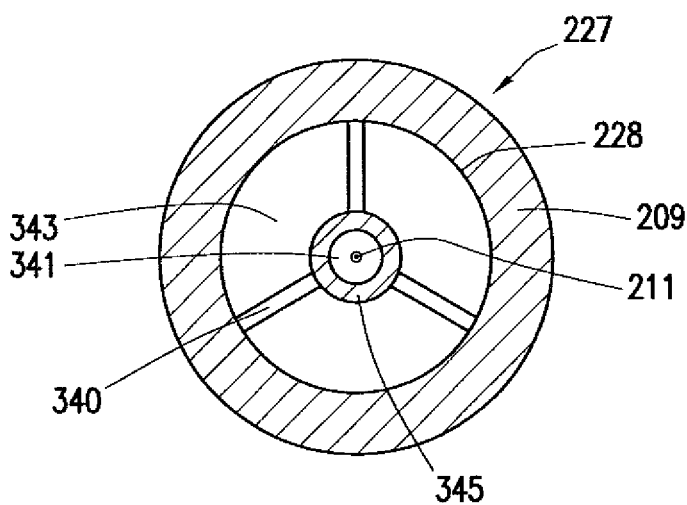
FIG. 3D

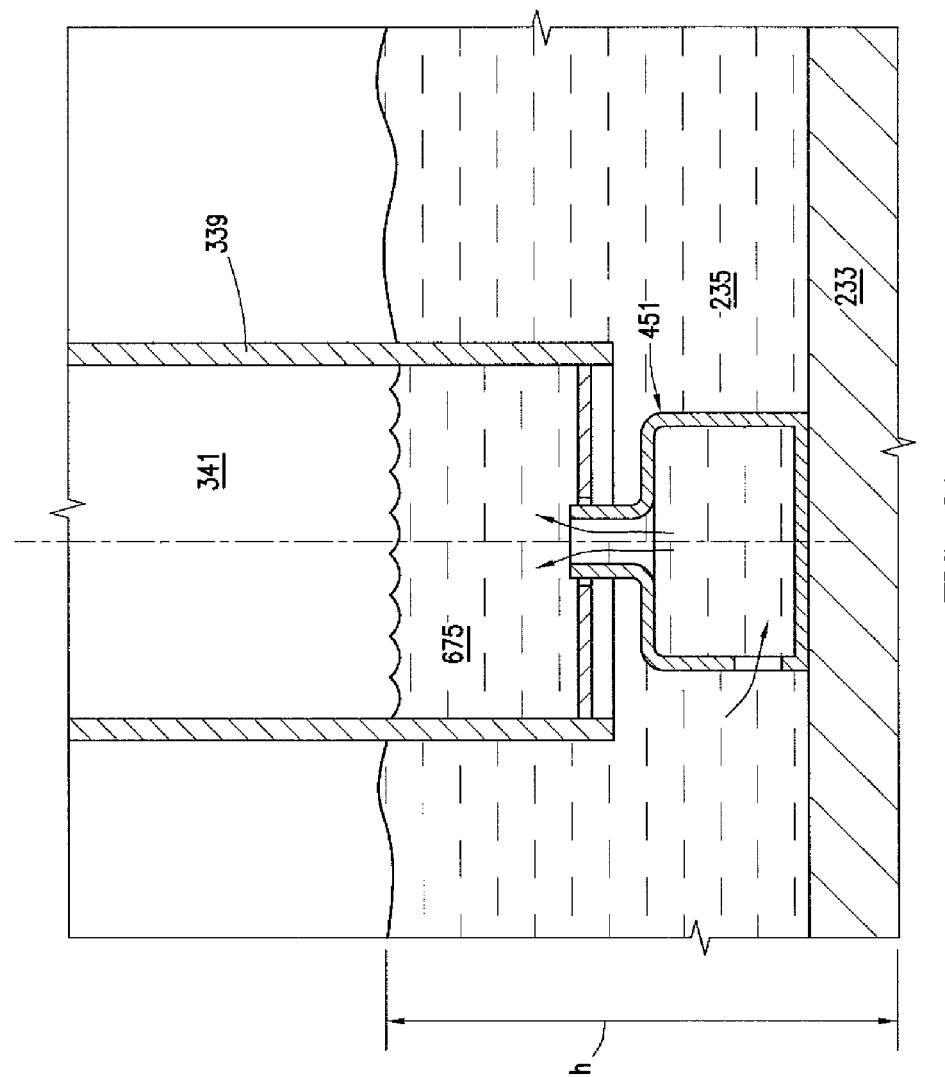

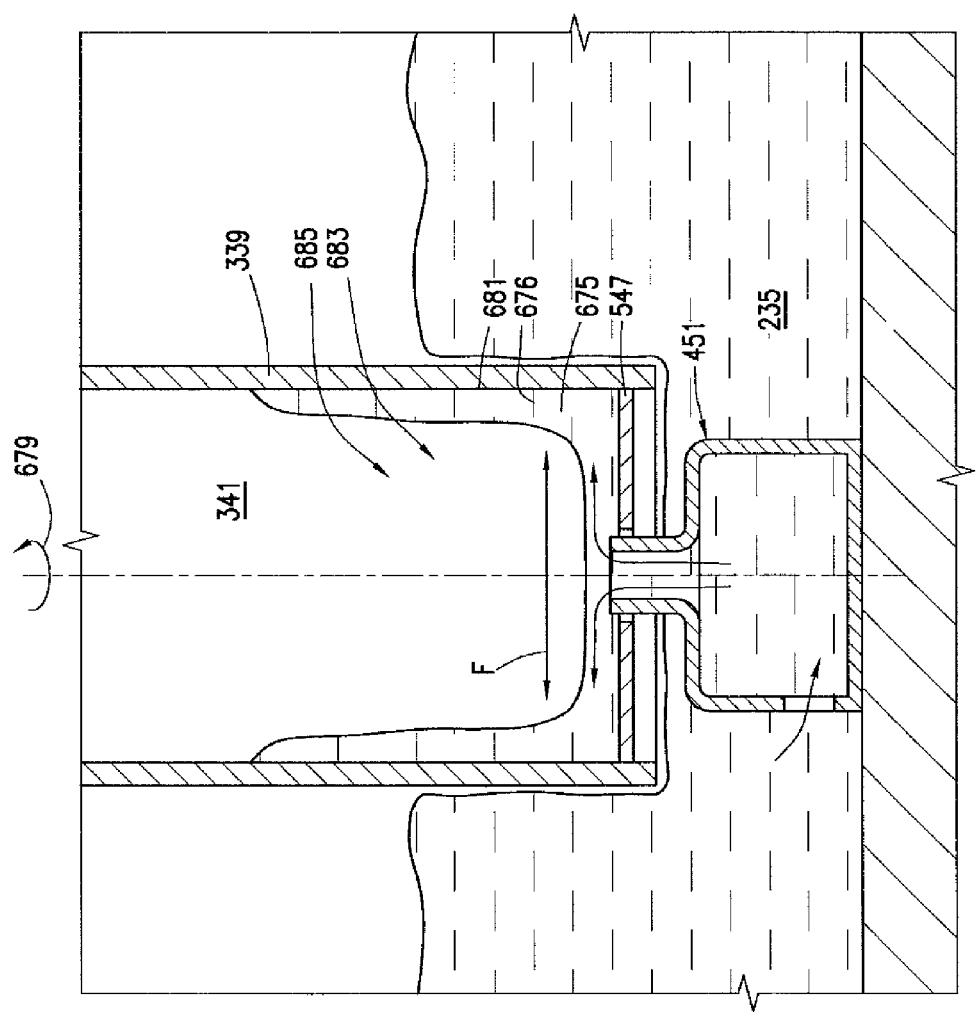

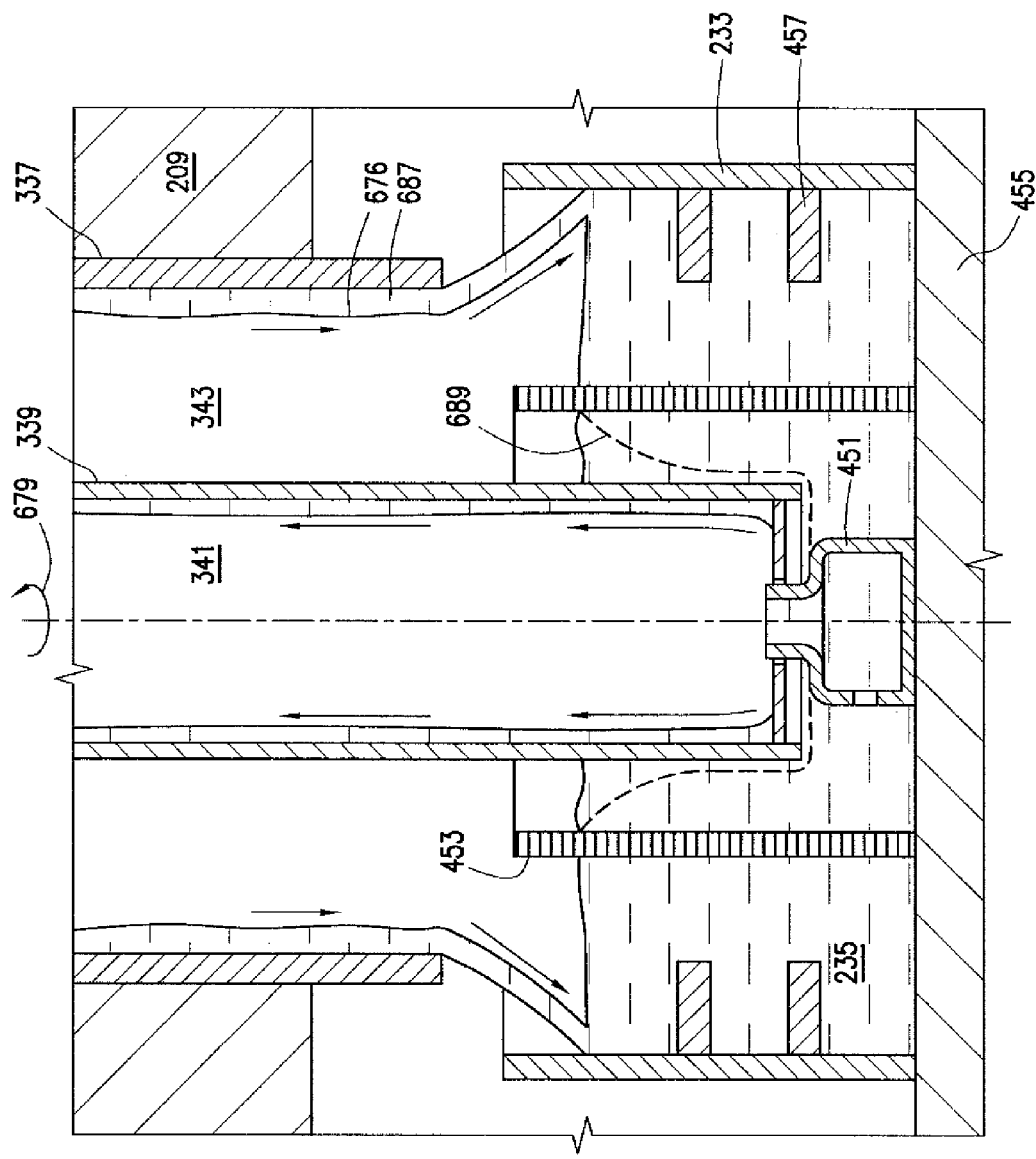

SELF-PUMPING FLYWHEEL COOLING SYSTEM

BACKGROUND OF INVENTION

In a typical flywheel energy storage application a flywheel is "charged" by connecting it to a motor-generator and electrical power is input to the motor-generator to spin up the flywheel, thereby converting electrical energy to kinetic energy. The kinetic energy stored in the form of the rotational kinetic energy of the flywheel can later be extracted by connecting an electrical load to the motor-generator. To minimize losses caused by air/wind resistance, the flywheel rotor typically operates in a partial vacuum environment.

Flywheel energy storage systems have been used in a number of different applications, including in uninterruptible power supply systems and energy storage systems for frequency regulation of the utility grid. Because of their continuous operation, heat build-up in the flywheel rotor is a problem that risks early failure of the flywheel apparatus. Furthermore, cooling via convective heat transfer is limited by the partial vacuum environment in which the flywheel rotor operates.

SUMMARY OF INVENTION

In general, in one aspect, the invention relates to a flywheel system including a flywheel rotor. The flywheel rotor is rotatably mounted within the flywheel system and includes a rotor shaft including a central bore formed therethrough, and an elongated fluid flow member disposed within the central bore of the flywheel rotor. The elongated fluid flow member includes an inner passage and a dam disposed on a first end of the inner passage, the dam comprising a central opening. The inner passage is open at a second end, and an outer passage that surrounds the inner passage. The outer passage is closed on an end surrounding the second end of the inner passage, and the outer passage is open on an end surrounding the first end of the inner passage. Hydrostatic pressure causes cooling fluid from a fluid reservoir to flow into the inner passage extending into the fluid reservoir at the first end, via the central opening of the dam. Rotation of the flywheel rotor causes the cooling fluid to accumulate along a wall of the inner passage, where the dam prevents the cooling fluid from exiting the inner passage at the first end, thereby causing the cooling fluid to propagate along the inner passage. The cooling fluid exits the inner passage at the second end and is released into the outer passage, where the closed end of the outer passage prevents the cooling fluid from exiting the outer passage at the end surrounding the second end of the inner passage, thereby causing the cooling fluid to propagate along the outer passage until released from the open end of the outer passage into the fluid reservoir.

A method for cooling a flywheel system. The flywheel system includes a flywheel rotor, rotatably mounted within the flywheel system. The rotor includes a rotor shaft including a central bore formed therethrough, and an elongated fluid flow member disposed within the central bore of the flywheel rotor. The elongated fluid flow member includes an inner passage, and a dam disposed on a first end of the inner passage, the dam including a central opening. The inner passage is open at a second end. An outer passage surrounds the inner passage. The outer passage is closed on an end surrounding the second end of the inner passage, and the outer passage is open on an end surrounding the first end of the inner passage. The method includes arranging a fluid reservoir so as to be in fluid communication with the elongated fluid flow member, and rotating the flywheel rotor to cause cooling fluid entering from the fluid reservoir and flowing into the inner passage at the first end, by hydrostatic pressure, to accumulate along a wall of the inner passage. The dam prevents the cooling fluid from exiting the inner passage at the first end, thereby causing the cooling fluid to propagate along the inner passage. The cooling fluid exits the inner passage at a second end and is released into the outer passage, where the closed end of the outer passage prevents the cooling fluid from exiting the outer passage at the end surrounding the second end of the inner passage, thereby causing the cooling fluid to propagate along the outer passage until released from the open end of the outer passage into the fluid reservoir.

Other aspects and advantages of the invention will be apparent from the following description and the appended claims.

BRIEF DESCRIPTION OF DRAWINGS

FIGS. 3A-3D show cross-sectional views of an elongated fluid flow member in accordance with one of more embodiments of the invention.

FIGS. 6A-6E show cross-sectional views of the fluid flow in the cooling system in accordance with one or more embodiments of the invention.

DETAILED DESCRIPTION

Embodiments disclosed herein relate to a system and method for cooling flywheels. Heat is removed from a flywheel rotor by a fluid, pumped through the flywheel rotor. However, the pumping action is not provided by a mechanical pump, but rather is provided indirectly by the rotary motion of the flywheel rotor itself. More specifically, in accordance with one or more embodiments, cooling fluid is circulated through the center of the rotor using a combination of hydrostatic pressure, centrifugal force caused by the rotation of the rotor, the incompressible nature of the fluid, and gravity. Accordingly, cooling fluid may be pumped through a flywheel without the need for an external fluid pump resulting in increased reliability and reduced cost for the system as a whole.

Figure 1:
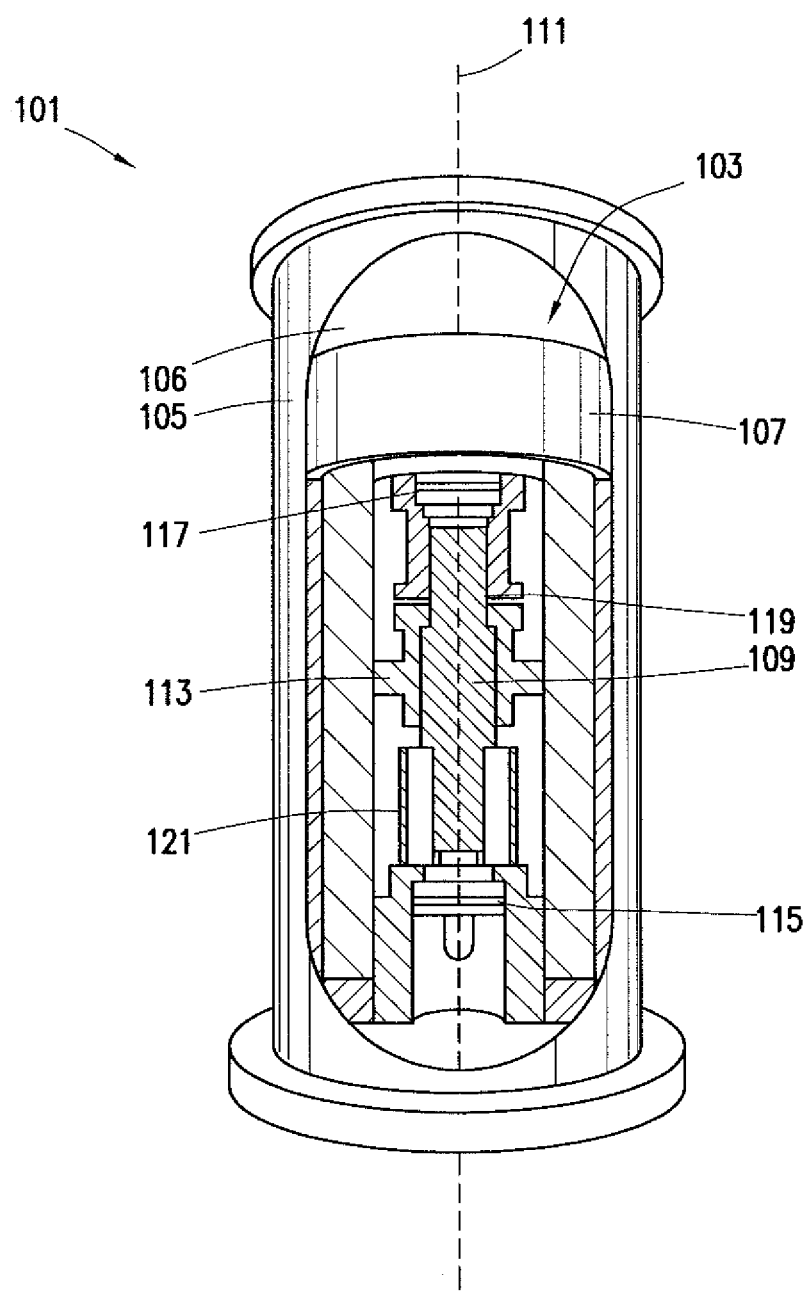
FIG. 1 shows a three-dimensional solid model of a flywheel energy storage system in accordance with one or more embodiments of the invention.

FIG. 1 shows a flywheel system 101 in accordance with one or more embodiments of the invention. The flywheel system 101 includes a vertically mounted flywheel rotor 103 that is mounted within a sealed vacuum chamber 105. The interior region 106 of the sealed vacuum chamber 105 provides a low drag (i.e., low air resistance) environment for the flywheel rotor 103. The flywheel rotor 103 includes a rotor shaft 109 and a cylindrical rim 107 mounted thereon via rotor hub 113, with the rotor shaft 109 able to rotate about vertical axis 111 by way of bearings 115 and 117 and magnetic lift system 119. The rotor shaft 109 is disposed within a central bore of the rotor hub 113 and is rigidly connected to the cylindrical rim 107 via rotor hub 113. In accordance with one or more embodiments, the cylindrical rim 107 is formed from a composite material, e.g., glass and/or carbon fiber embedded in a matrix, e.g., thermoplastic resin, epoxy, or the like. However, the cylindrical rim 107 may be formed from any other material, including non-composites such as steel, without departing from the scope of the present disclosure. In order to rotatably support the flywheel rotor 103, radial bearings 115 and 117, e.g., mechanical and/or magnetic bearings are mounted to a stationary housing (not shown). In addition, magnetic lift system 119 provides axial support, by way of magnetic levitation, to the rotor shaft 109.

When spinning, the flywheel rotor 103 stores energy in the form of rotational kinetic energy and therefore may be used as an energy storage system—essentially a mechanical battery. Such a flywheel may be used in isolation or as part of a larger flywheel array for a number of different energy storage applications, including as an emergency storage system, an uninterruptible power supply (UPS), and/or a system that may absorb or inject power into the utility grid for grid stabilization, frequency regulation, etc. In general, the above flywheel system may also be used in any other energy storage application without departing from the scope of the present disclosure.

The flywheel system 101 may further include a motor-generator 121 that controls the rotation of the flywheel rotor 103 through an electromagnetic system. For example, the motor-generator 121 may accelerate and/or decelerate the flywheel rotor 103 depending on whether or not the motor-generator 121 functions as a motor or generator. In the motor configuration, the motor-generator 121 uses power from an external power source (e.g., the electric utility grid (not shown)) to accelerate flywheel rotor 103 to a higher angular velocity, thereby increasing the rotational kinetic energy stored in the flywheel rotor 103. In accordance with one or more embodiments of the invention, the electrical energy that is used to accelerate the flywheel rotor 103 may be energy that is absorbed from an electrical grid or load (not shown). In the generator configuration, the motor-generator 121 converts the rotational kinetic energy stored in the flywheel rotor 103 into electricity, thereby decreasing the angular velocity of the flywheel rotor 103. In accordance with one or more embodiments of the invention, the electrical energy that is generated by the deceleration of the flywheel rotor 103 may be injected back into the electrical grid or load (not shown).

Figure 2:
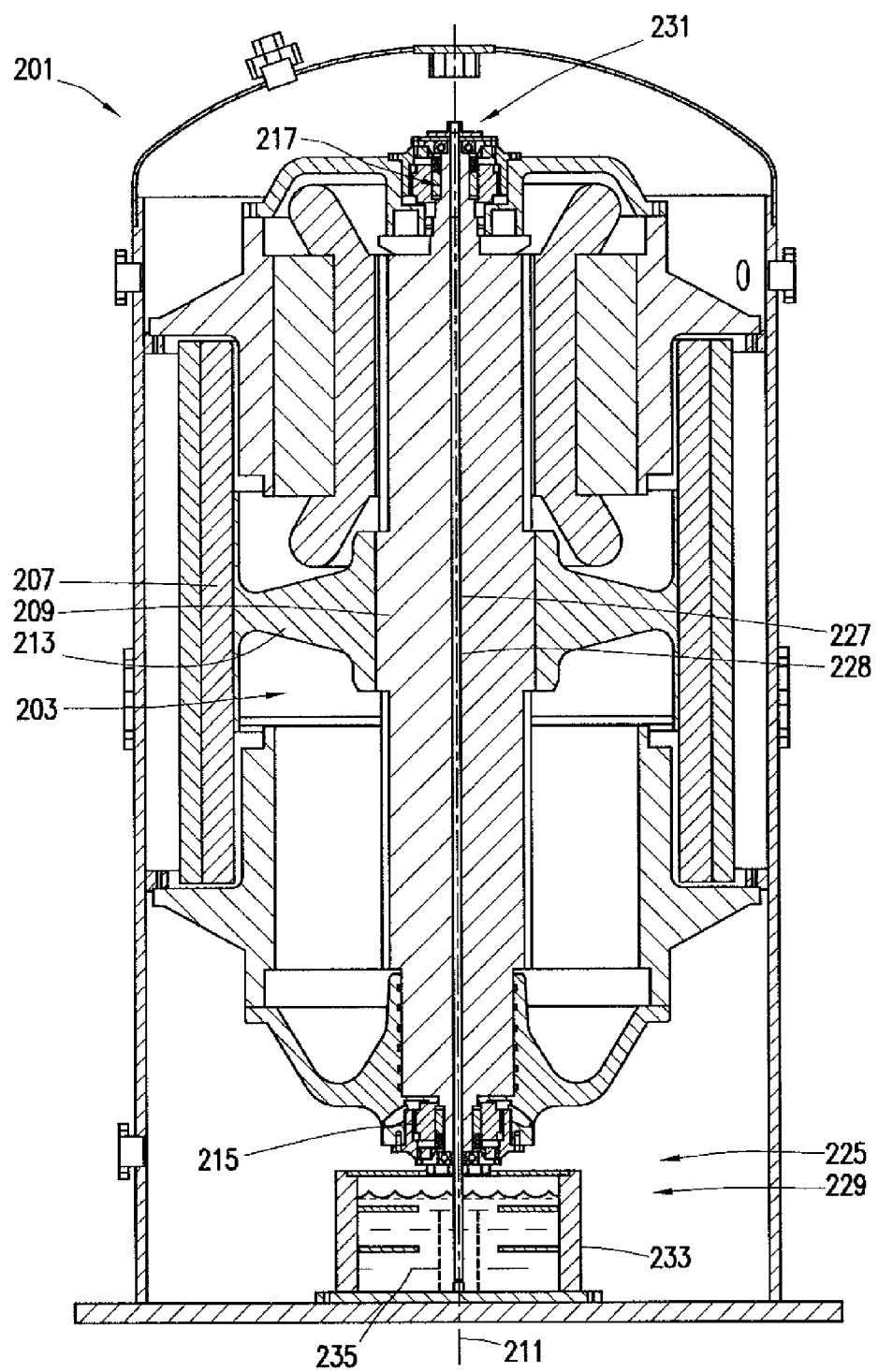
FIG. 2 shows a cross-sectional view of a flywheel energy storage system in accordance with one or more embodiments of the invention.

FIG. 2 shows a cross-sectional view of a flywheel system 201 including a flywheel rotor 203 and a cooling system 225 in accordance with one or more embodiments of the invention. The flywheel rotor 203 includes a rotor hub 213, a rotor shaft 209, and a cylindrical rim 207. In accordance with one or more embodiments of the invention, the cylindrical rim 207 may be a cylindrically symmetric shell having a longitudinal axis that is vertically oriented with respect to gravity and is substantially parallel to common vertical axis 211. The rotor shaft 209 is disposed within a central bore of the rotor hub 213 and is rigidly connected to the rotor hub 213. Further, the cylindrical rim 207 is rigidly connected to the rotor hub 213. In one or more embodiments of the invention, the rigid connections between rotor shaft 209 and rotor hub 213, and between rotor hub 213 and cylindrical rim 207 are press-fits. However, those skilled in the art, having the benefit of this detailed description, will appreciate that any technique suitable for establishing a rigid mechanical connection may be used to connect rotor shaft 209 to rotor hub 213, and to connect rotor hub 213 to cylindrical rim 207. Accordingly, the cylindrical rim 207 and rotor shaft 209 are coaxially aligned on common axis 211. The common axis 211 also represents the rotation axis of cylindrical rim 207, rotor shaft 209, and rotor hub 213. Radial bearings 215 and 217 provide radial support to the rotor shaft 209. Radial bearings 215 and 217 may be mechanical bearings, magnetic bearings, or any other bearing without departing from the scope of the present disclosure.

The cooling system 225 includes at least one elongated fluid flow member 227 that longitudinally traverses the rotor shaft 209 by way of a central bore 228 formed through the rotor shaft and disposed along the rotation axis of the flywheel rotor 203 (along common axis 211). The lower end of the elongated fluid flow member 227 terminates in a first end region 229, located below the flywheel rotor 203, and the upper end of the elongated fluid flow member 227 terminates in a second end region 231, located above the flywheel rotor 203. The first end region 229 further includes a fluid reservoir 233 that holds a cooling fluid 235. In accordance with one or more embodiments of the invention, the cooling fluid 235 may circulate through the fluid flow member 227 to remove heat from the flywheel rotor 203. The cooling fluid 235 may flow in both an upward direction and in a downward direction. In accordance with one or more embodiments, the fluid reservoir 233 is disposed under the flywheel rotor 203 so that cooling fluid 235 that is pumped upward (from the fluid reservoir 233, through the elongated fluid flow member 227, to the top of the flywheel rotor 203 near second end region 231) may later return to the fluid reservoir 233 (from the top of the flywheel rotor 203 near second end region 231, through the elongated fluid flow member 227, back to the fluid reservoir 233 disposed under the flywheel rotor 203), as described in more detail below in reference to FIGS. 6A-6E. Accordingly, the cooling system 225 is a closed loop cooling system for the flywheel rotor 203.

Figure 3A:
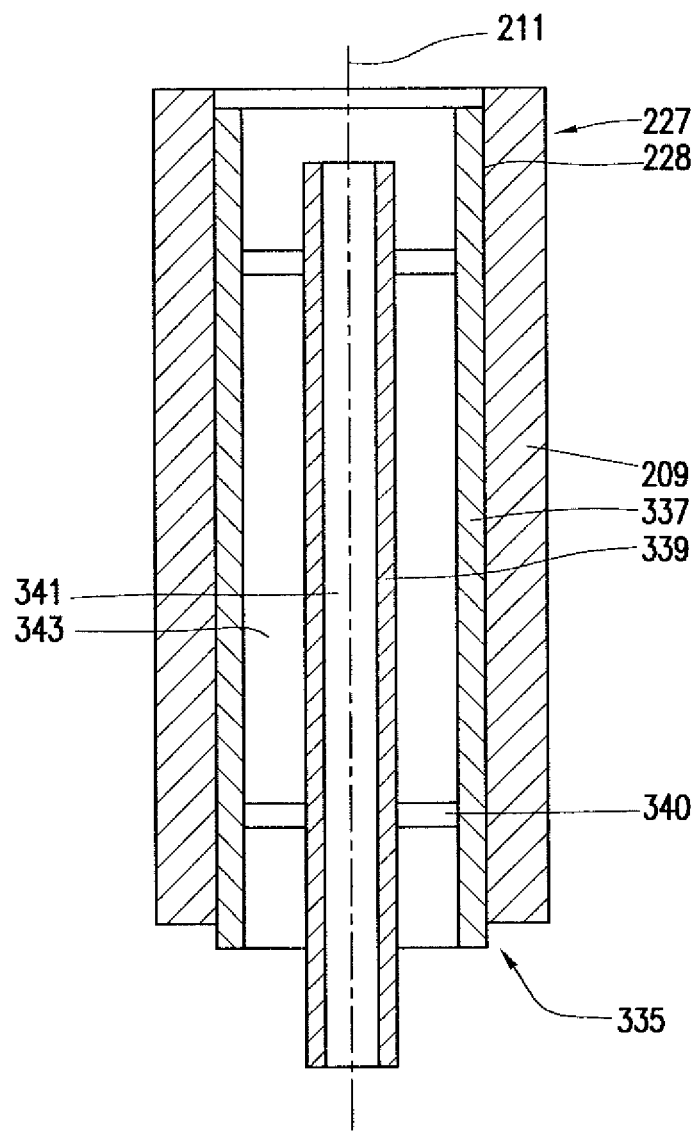
Figure 3B:
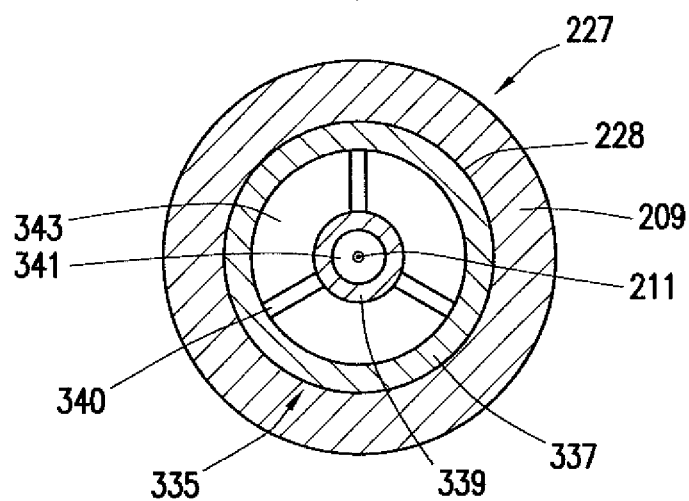

FIGS. 3A-3D show cross-sectional views of the elongated fluid flow member 227 that is disposed within a central bore 228 of the rotor shaft 209. In the embodiment shown in FIGS. 3A and 3B, the elongated fluid flow member 227 is an elongated double-walled cylindrical tube 335. The outer tube 337 and the inner tube 339 of the double-walled cylindrical tube 335 are rigidly connected with standoffs 340 that serve to align the two tubes coaxially along common axis 211. In one or more embodiments of the invention, the rigid connections between outer tube 337, inner tube 339, and standoffs 340 are obtained using a brazing process. However, those skilled in the art, having the benefit of this detailed description, will appreciate that any technique suitable for establishing a rigid mechanical connection may be used to connect outer tube 337, inner tube 339, and standoffs 340. The double-walled cylindrical tube 335 thus provides an inner fluid passage 341 with a circular cross section and an outer fluid passage 343 with an annular cross section, as shown in FIG. 3B. In the embodiment shown in FIG. 3A and FIG. 3B, the double-walled cylindrical tube 335 is disposed within the central bore 228 of the rotor shaft, e.g., rotor shaft 109 or 209. The double-walled cylindrical tube 335 is rigidly connected to the rotor shaft 209 and therefore rotates with rotor shaft 209, rotor hub 213, and cylindrical rim 207. In one or more embodiments of the invention, the rigid connection between rotor shaft 209 and double-walled cylindrical tube 335 is a press-fit. The press fit may be obtained, for example, by temporarily heating up the rotor shaft 209, thereby temporarily increasing the diameter of the central bore 228, and allowing the insertion of the double-walled cylindrical tube 335 into the central bore 228 of rotor shaft 209. The inner diameter of the central bore 228 and the outer diameter of the double-walled cylindrical tube 335 are selected to provide a press-fit at or below the maximum operating temperature of the flywheel rotor 203. However, those skilled in the art, having the benefit of this detailed description, will appreciate that any technique suitable for establishing a rigid mechanical connection may be used to connect double-walled cylindrical tube 335 to rotor shaft 209.

In another embodiment, as shown in FIGS. 3C and 3D, the elongated fluid flow member 227 is an elongated single-walled cylindrical tube 345 disposed within a central bore 228 of the rotor shaft 209. The single-walled cylindrical tube 345 is rigidly connected to the rotor shaft 209 with standoffs 340, thereby aligning rotor shaft 209 and single-walled cylindrical tube 345 coaxially along common axis 211. Therefore, single-walled cylindrical tube 345 rotates with rotor shaft 209, rotor hub 213, and cylindrical rim 207. An inner fluid passage 341 with a circular cross section is provided by the inside of the single-walled cylindrical tube 345, and an outer fluid passage 343 with an annular cross section is provided by the open space between the inner wall of the bore 228 and the outer wall of the single-walled cylindrical tube 345, as shown in FIG. 3D.

Figure 4:
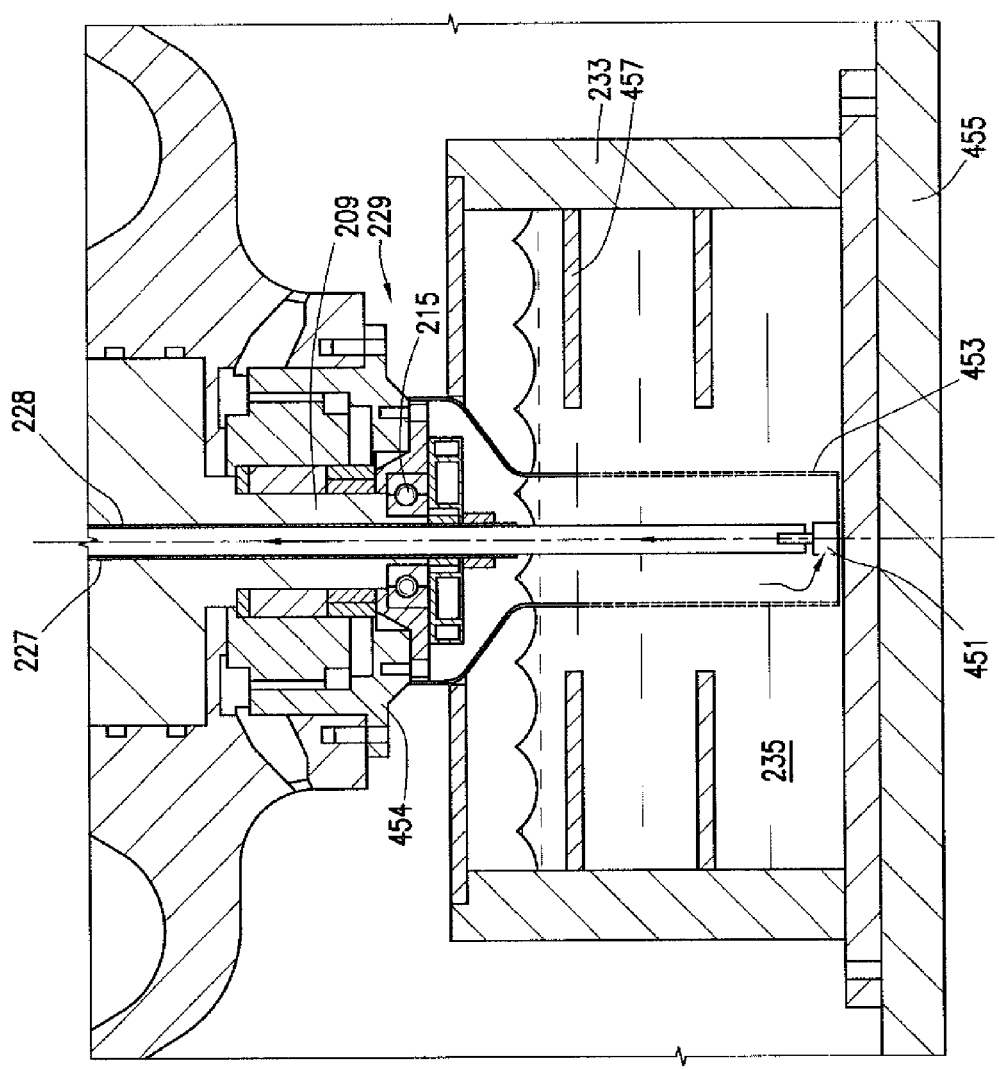
FIG. 4 shows a cross-sectional view of a first end region of a flywheel cooling system in accordance with one or more embodiments of the invention.

FIG. 4 shows a cross-sectional view of the first end region 229 in accordance with one or more embodiments of the invention. In the embodiment shown, the fluid flow member 227 exits the central bore 228 of the rotor shaft 209 below the radial bearing 215 and extends into fluid reservoir 233. In the illustrative embodiment shown in FIG. 4, a fluid nozzle 451 is disposed on the bottom of a vertically oriented perforated cylinder 453. The top portion of the perforated cylinder 453 is affixed to stationary housing 454, and the perforated cylinder 453 extends downward toward the bottom of the fluid reservoir 233. In other embodiments, the perforated cylinder 453 may be affixed directly to the floor of the fluid reservoir 233 and need not be affixed to the stationary housing 454. Those skilled in the art, having the benefit of this detailed description, will appreciate that the perforated cylinder may have any design suitable for inhibiting the development of a fluid vortex 233 within the fluid reservoir, as further described below. In yet another embodiment, the fluid nozzle 451 may be directly affixed to any other stationary part of the flywheel system.

In accordance with one or more embodiments of the invention, the fluid reservoir 233 may be made of a thermally conductive material such as metal, e.g., stainless steel, thereby enabling it to conduct heat away from the cooling fluid 235 to an adjacent structure 455, e.g., a heat sink or the like. In accordance with one or more of the embodiments of the invention, fins 457 may be added inside the fluid reservoir 233, along the inner walls of the fluid reservoir 233, to increase the fluid reservoir surface area that is in contact with cooling fluid 235, thereby improving thermal conduction.

Figure 5:
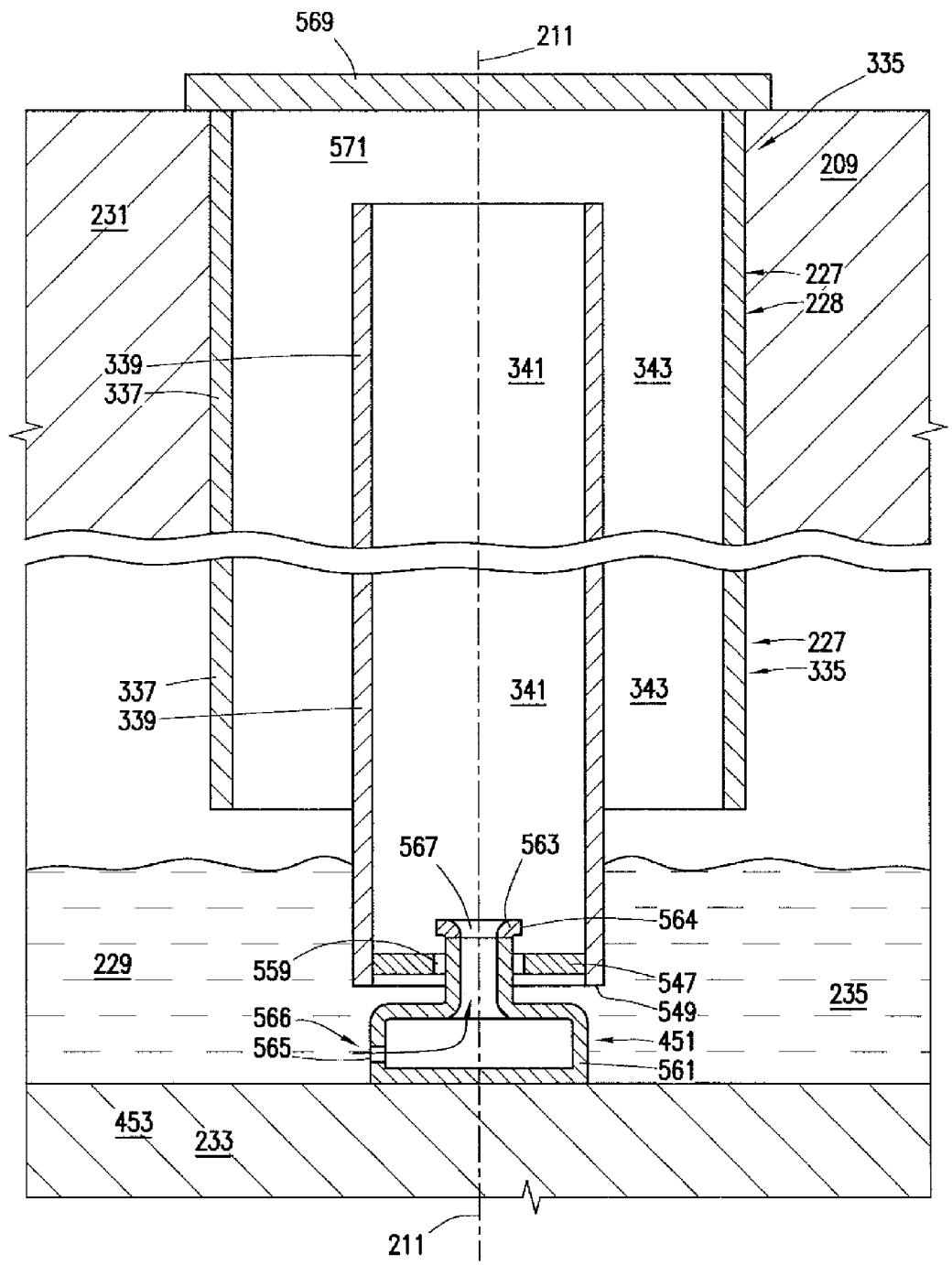
FIG. 5 shows a cross-sectional view of a first end region and of a second end region of a flywheel cooling system in accordance with one or more embodiments of the invention.

FIG. 5 shows a cross-sectional detail view of the first end of the elongated fluid flow member 227 near first end region 229, and a cross-sectional view of the second end of the elongated fluid flow member 227 near second end region 231, in accordance with one or more embodiments of the invention. The inner tube 339 of elongated fluid flow member 335 extends into the fluid reservoir 233 and terminates near the floor of the fluid reservoir 233. The precise position of termination will depend on the hydrostatic pressure required, and thus the precise height at which the inner tube 339 terminates may vary depending on the requirements of a particular implementation. In accordance with one or more embodiments, a first end 549 of inner tube 339 and fluid nozzle 451 are immersed in the cooling fluid 235 contained within the fluid reservoir 233 so that cooling fluid 235 may be forced through the nozzle 451 and into the inner tube 339 by way of hydrostatic pressure.

Disposed at the first end 549 of inner tube 339 is a ring-shaped dam 547. The dam 547 is rigidly attached to the first end 549 of inner tube 339 and has a central opening having a diameter that is larger than the outer diameter of fluid nozzle 451. In one or more of the embodiments of the invention, the dam 547 may be, for example, a circular disk, that partially blocks the otherwise open first end 549 of inner tube 339.

The fluid nozzle 451 includes a nozzle base 561, rigidly attached to the floor of the perforated cylinder 453 or the floor of the fluid reservoir 233. The fluid nozzle 451 further includes a cylindrical nozzle tip 563 that projects vertically upward from nozzle base 561 and that extends into inner tube 339 through central opening 559 of dam 547. The central axis of fluid nozzle tip 563 may coincide with common vertical axis 211 of inner tube 339, dam 547, and central circular opening 559. The outer diameter of the cylindrical nozzle tip 563 is slightly smaller than the inner diameter of central circular opening 559 in dam 547. The resulting small gap allows inner tube 339 and dam 547 to freely rotate about the stationary fluid nozzle 451, without contact, as rotor shaft 209 rotates during operation of the flywheel. In one or more embodiments of the invention, the nozzle tip 563 may be equipped with an outward extending lip 564. The diameter of the nozzle at the nozzle tip 563 equipped with the lip 564 is slightly smaller than the diameter of central opening 559 of dam 547, thereby enabling sliding the bottom end of inner tube 549, equipped with dam 547, over nozzle tip 563 and lip 564 during the assembly of the flywheel system 201. The diameter of the nozzle tip 563 below lip 564 may be reduced in order to provide extra clearance between nozzle tip 563 and dam 547 during operation of the flywheel.

In accordance with one or more embodiments of the invention, the stationary fluid nozzle 451 provides a pathway for cooling fluid 235 to pass from cooling fluid reservoir 233 to the inner fluid passage 341 inside of rotating inner tube 339. For example, a fluid input port 565 may be located near the nozzle base 561, and a fluid output port 567 may be located at the nozzle tip 563, thereby forming a fluid passage 566 through the inside of the fluid nozzle 451. In one or more embodiments of the invention, the size of the fluid passage 566 may be selected to obtain a desired fluid flow into rotating inner tube 339. Smaller diameter fluid passages provide reduced fluid flow, whereas larger diameter fluid passages provide increased fluid flow. Fluid may be forced through the fluid passage 566 and into the inner tube 339 by way of hydrostatic pressure.

Once inside the inner tube 339, fluid will rise toward the second end of the fluid flow member 227, as described in more detail below in reference to FIGS. 7A-7D. In one or more embodiments of the invention, the top end of the central bore 228 of the rotor shaft 209 is sealed by a cap 569, rigidly attached to the top end of the rotor shaft 209. Alternatively, in one or more embodiments of the invention, the cap 569 may seal the top end of the outer tube 337. Further, in one or more embodiments of the invention where the central bore 228 of the rotor shaft 209 terminates within the rotor shaft 209, rather than traversing the rotor shaft 209 to the top end of the rotor shaft 209, the top end of the central bore 228, terminating inside the rotor shaft, may seal the central bore 228, thus obviating the need for a cap. As shown in FIG. 5, in accordance with one or more embodiments of the invention, fluid flow member 227 may consist of coaxially arranged outer tube 337 and inner tube 339. Inner tube 339 terminates inside outer tube 337, at the second end of the double-walled cylindrical tube 335, below cap 569. Outer tube 337 extends slightly above the end of inner tube 339, thereby leaving a gap 571 between the second end of inner tube 339 and cap 569. Gap 571 forms a fluid passage for upward-moving cooling fluid 235 in inner fluid passage 341 to transfer to outer fluid passage 343 for subsequent downward return.

As shown in FIG. 5, outer fluid passage 343 terminates in first end region 229 above the fluid reservoir 233. The first end of outer tube 337, terminating below the radial bearing 215 (not shown) and above the fluid reservoir 233, forms an opening of outer fluid passage 343 and provides a pathway for cooling fluid 235 in the outer fluid passage 343 to return to the fluid reservoir 233, located below the outer fluid passage 343.

In accordance with one or more embodiments, the above-described structure allows for cooling fluid 235 to enter the inner fluid passage 341 from the fluid reservoir 233, move upward to the second end of the double-walled cylindrical tube 335 via the inner fluid passage 341, transfer to the outer fluid passage 343, and finally return downward to the fluid reservoir 233 via outer fluid passage 343.

FIGS. 6A-6E describe one or more embodiments of a cooling process for flywheel system 201 (not shown) using the self-pumping cooling system 225 (not shown). Beginning with FIG. 6A, cooling fluid 235, stored in fluid reservoir 233, is forced into inner fluid passage 341 by a hydrostatic pressure, proportional to the fluid level h in fluid reservoir 233. The cooling fluid 235 enters inner fluid passage 341 via fluid nozzle 451. Assuming a situation without any additional forces, e.g., as would be the case for a non-rotating system, the cooling fluid 235 entering via the fluid nozzle 451 would form a fluid accumulation 675, with the fluid inflow continuing until an equilibrium is reached when the fluid level h in the inner fluid passage 341 reaches the fluid level in fluid reservoir 233.

FIG. 6B, shows a different situation, where the inner tube 339 is beginning to rotate. A centrifugal force F results from the rotary motion 679 of inner tube 339 and dam 547. The effect of the centrifugal force F on the fluid accumulation 675 is to displace a portion of the cooling fluid 676 in the inner fluid passage 341 radially outward against the inner wall 681 of inner tube 339. For high enough rotational speeds, a fluid vortex 683 forms inside the inner tube 339. Generally, centrifugal force increases with the square of angular velocity. Increasing angular velocity would therefore result in a more prominent vortex 683 with a higher centrifugal force F that serves to press the cooling fluid 676 against the inner wall 681 of the inner tube 339. Accordingly, as the angular velocity increases, the central area 685 without cooling fluid 676 also increases in size.

Figure 6C:
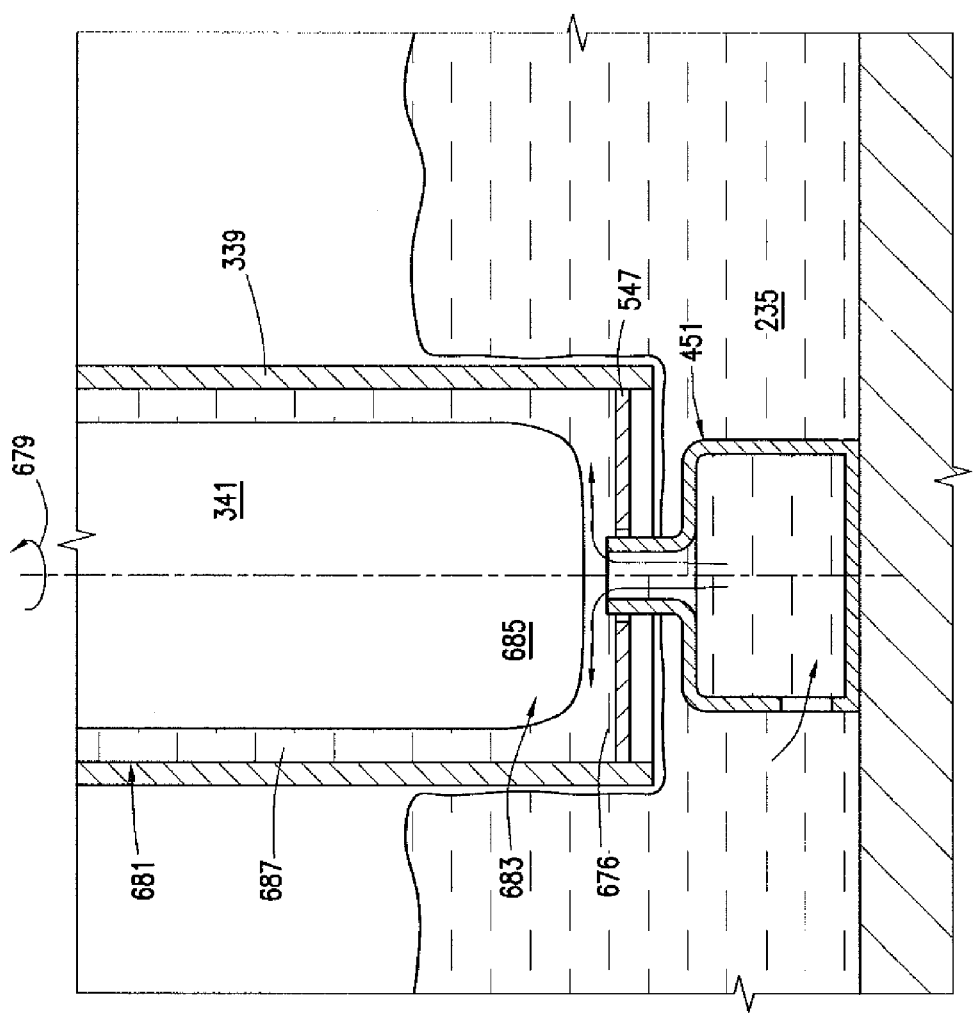

As shown in FIG. 6C, above certain angular velocities, the central area 685 without fluid extends to near the inner wall 681 of the inner tube 339, thereby forcing the cooling fluid 676 to form a fluid layer 687 that lines the inner wall 681 of the inner tube 339. To accommodate a fixed volume of incompressible fluid in an increasingly thin layer of fluid, such a fluid layer needs to cover an increasing surface area. Unencumbered by any external surface blockages, the fluid layer 687 would spread down the inner wall 681 of the inner tube 339. However, dam 547 prevents the fluid layer 687 from spreading downward (i.e., dam 547 serves as a fluid dam) and forces the fluid layer 687 to expand upward along the inner wall 681 of the inner tube 339, as shown in FIG. 6C. The fluid layer 687 keeps extending upward while additional fluid 235 from fluid reservoir 233 continuously enters the inner passage 341 inside the inner tube 339 via the fluid nozzle 451, thus supporting a continuous upward transfer of fluid along the inner wall 681 of the inner tube 339.

Figure 6D:
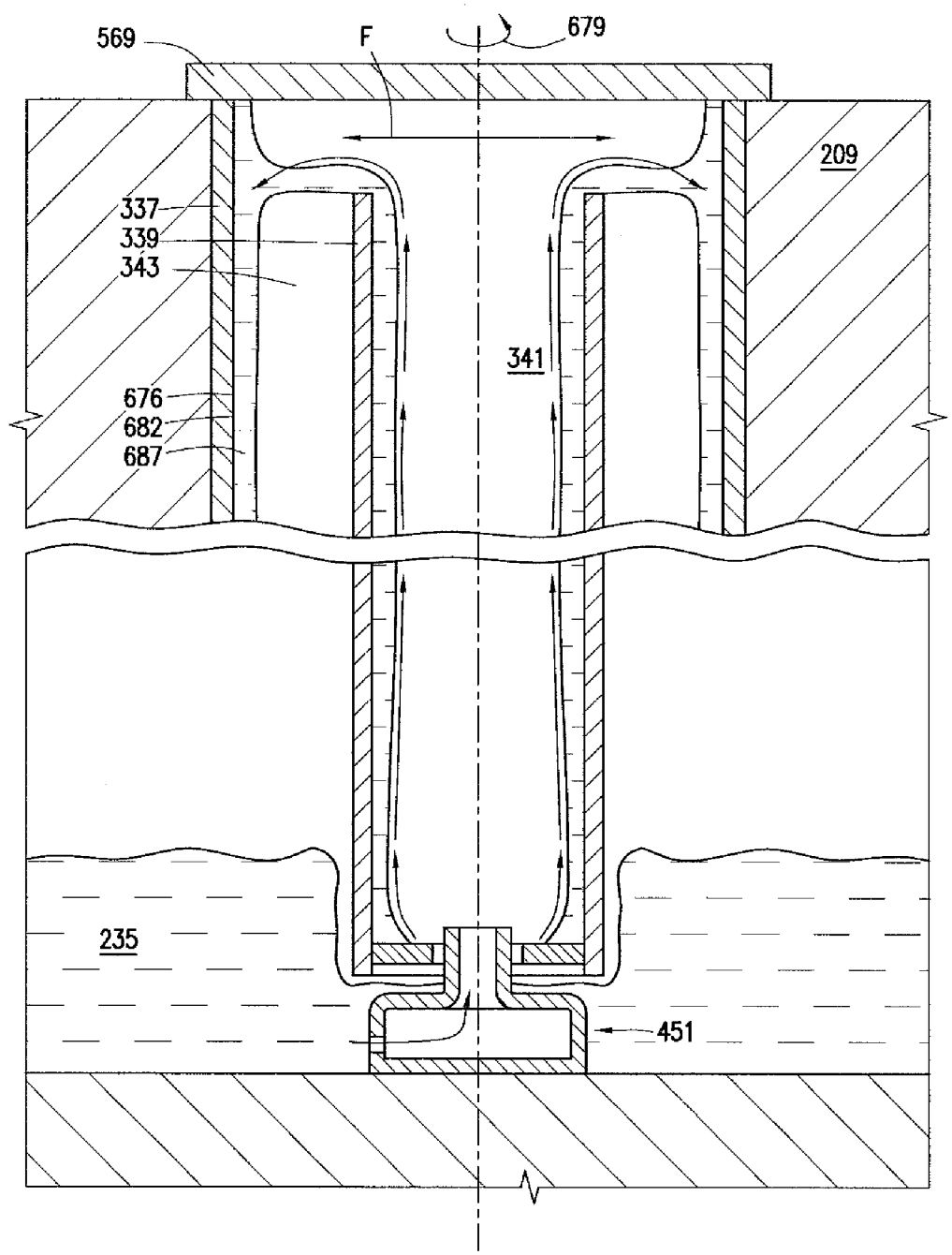

As shown in FIG. 6D, the cooling fluid 676 exits inner fluid passage 341, formed by inner tube 339, through the open second end of inner tube 339 and is caught by surrounding outer tube 337 forming the outer fluid passage 343. Centrifugal force 677 throws the cooling fluid 676 outward to the inner wall 682 of the outer tube 337, and the cooling fluid 676 then flows down the annular outer fluid passage 343 due to centrifugal force. While passing down through rotor shaft 209 or along the inner wall of outer tube 682, the cooling fluid 676 removes heat from the flywheel rotor 203 (not shown) via conductive heat transfer as it flows down the outer fluid passage 343, thereby cooling the flywheel rotor 203 (not shown).

As shown in FIG. 6E, the cooling fluid 676 exits the annular outer fluid passage 343 at the first end of the outer tube 337, below the radial bearing 215 (not shown), and is collected by fluid reservoir 233. In the fluid reservoir 233, the heat is then removed from the cooling fluid 235 via conductive heat-transfer. Heat is collected by the fins 457 that protrude into the fluid reservoir 233, and then is transferred via the fluid reservoir 233 to the adjacent structure 455, before the cycle described above repeats.

In accordance with one or more embodiments, the stationary perforated cylinder 453, installed in the fluid reservoir 233, prevents the development of a fluid vortex 689 inside the fluid reservoir 233 but outside of the inner tube 339. Without the stationary perforated cylinder 453, a fluid vortex may develop within the fluid reservoir 233 due to the rotational movement 679 of inner tube 339. However, a fluid vortex outside the inner tube 339 would reduce the hydrostatic pressure or, if fully developed, would even lead to absence of fluid 235 at the fluid nozzle 451, thus inhibiting or preventing the flow of cooling fluid 235 from the fluid reservoir 233 into the inner fluid passage 341. The perforation of the perforated cylinder 453 allows fluid exchange between the inside and the outside of the perforated cylinder 453 while providing sufficient resistance to a swirling movement of the cooling fluid 235 to prevent the formation of a vortex 689 inside the fluid reservoir 233.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A flywheel system comprising:
 a flywheel rotor, rotatably mounted within the flywheel system, the flywheel rotor comprising:
  a rotor shaft comprising a central bore formed therethrough; and
 an elongated fluid flow member disposed within the central bore of the flywheel rotor;
 wherein the elongated fluid flow member comprises:
  an inner passage;
  a dam disposed on a first end of the inner passage, the dam comprising a central opening;
  wherein the inner passage is open at a second end, and an outer passage that surrounds the inner passage;
wherein the outer passage is closed on an end surrounding the second end of the inner passage,
wherein the outer passage is open on an end surrounding the first end of the inner passage, and
wherein the inner passage and the outer passage are fixedly attached to the rotor shaft,
wherein hydrostatic pressure causes cooling fluid from a fluid reservoir to flow into the inner passage extending into the fluid reservoir at the first end, via the central opening of the dam;
wherein rotation of the inner passage of the elongated fluid flow member together with the flywheel rotor causes the cooling fluid to accumulate along a wall of the inner passage,
wherein the dam prevents the cooling fluid from exiting the inner passage at the first end, thereby causing the cooling fluid to propagate along the inner passage,
wherein the cooling fluid exits the inner passage at the second end and is released into the outer passage;
wherein the closed end of the outer passage prevents the cooling fluid from exiting the outer passage at the end surrounding the second end of the inner passage, thereby causing the cooling fluid to propagate along the outer passage until released from the open end of the outer passage into the fluid reservoir.

2. The flywheel system of claim 1 further comprising:
a fluid nozzle comprising a nozzle tip,
wherein the nozzle tip extends into the inner passage via the central opening of the dam;
wherein cooling fluid from the fluid reservoir, forced by the hydrostatic pressure, flows through the fluid nozzle, via an opening at the nozzle tip, past the dam, into the inner passage at the first end.

3. The flywheel system of claim 1,
wherein the elongated fluid flow member comprises:
an inner tube that provides the inner passage;
an outer tube that surrounds the inner tube; and
wherein an outer surface of the inner tube and an inner surface of the outer tube define bounds of the outer passage that surrounds the inner passage, and
wherein, in a second end region of the elongated fluid flow member, the inner passage and outer passage are open, thereby forming a fluid path from the inner passage to the outer passage.

4. The flywheel system of claim 1,
wherein the elongated fluid flow member comprises:
a tube that provides the inner passage; and
wherein an outer surface of the tube and an inner surface of the central bore define bounds of the outer passage that surrounds the inner passage, and
wherein, in a second end region of the elongated fluid flow member, the inner passage and outer passage are open, thereby forming a fluid path from the inner passage to the outer passage.

5. The flywheel system of claim 4, wherein the outer passage is open to the fluid reservoir thereby forming a fluid path from the outer passage to the fluid reservoir.

6. The flywheel system of claim 1, wherein the fluid reservoir comprises a plurality of cooling fins to increase a surface area available for heat removal.

7. The flywheel system of claim 1, further comprising a stationary perforated cylinder that surrounds the inner passage of the elongated fluid flow member, wherein the stationary perforated cylinder is at least partially submerged in the cooling fluid reservoir.

8. A method for cooling a flywheel system comprising:
a flywheel rotor rotatably mounted within the flywheel system, the rotor comprising:
a rotor shaft comprising a central bore formed therethrough; and
an elongated fluid flow member disposed within the central bore of the flywheel rotor,
wherein the elongated fluid flow member comprises:
an inner passage; and
a dam disposed on a first end of the inner passage, the dam comprising a central opening,
wherein the inner passage is open at a second end, and
an outer passage that surrounds the inner passage,
wherein the outer passage is closed on an end surrounding the second end of the inner passage,
wherein the outer passage is open on an end surrounding the first end of the inner passage, and
wherein the inner passage and the outer passage are fixedly attached to the rotor shaft;
the method comprising:
arranging a fluid reservoir so as to be in fluid communication with the elongated fluid flow member; and
rotating the inner passage of the elongated fluid flow member together with the flywheel rotor to cause cooling fluid entering from the fluid reservoir and flowing into the inner passage at the first end, by hydrostatic pressure, to accumulate along a wall of the inner passage;
wherein the dam prevents the cooling fluid from exiting the inner passage at the first end, thereby causing the cooling fluid to propagate along the inner passage,
wherein the cooling fluid exits the inner passage at a second end and is released into the outer passage;
wherein, the closed end of the outer passage prevents the cooling fluid from exiting the outer passage at the end surrounding the second end of the inner passage, thereby causing the cooling fluid to propagate along the outer passage until released from the open end of the outer passage into the fluid reservoir.

9. The method for cooling a flywheel system of claim 8, further comprising preventing,
by a stationary perforated cylinder that surrounds the first end of the elongated fluid flow member,
the development of a fluid vortex inside the fluid reservoir.

10. The flywheel system of claim 1, wherein the flowing of the cooling fluid from the fluid reservoir into the inner passage does not require a pump.

11. The flywheel system of claim 8, wherein the flowing of the cooling fluid from the fluid reservoir into the inner passage does not require a pump.

* * * * *